(12) United States Patent
Moeglein et al.

(10) Patent No.: US 8,812,019 B2
(45) Date of Patent: Aug. 19, 2014

(54) PROVIDING WIRELESS TRANSMITTER ALMANAC INFORMATION TO MOBILE DEVICE BASED ON EXPECTED ROUTE

(75) Inventors: Mark L. Moeglein, Ashland, OR (US); Gengsheng Zhang, Cupertino, CA (US); Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/204,577

(22) Filed: Aug. 5, 2011

(65) Prior Publication Data

US 2013/0035111 A1 Feb. 7, 2013

(51) Int. Cl.
*H04W 24/00* (2009.01)
*G01S 5/02* (2010.01)
*H04W 4/02* (2009.01)

(52) U.S. Cl.
CPC ............ *H04W 4/028* (2013.01); *G01S 5/0236* (2013.01)
USPC .................................... 455/456.1; 455/456.3

(58) Field of Classification Search
USPC ........................................... 455/456.1, 456.3
See application file for complete search history.

(56) References Cited

U.S. PATENT DOCUMENTS

| | | | |
|---|---|---|---|
| 6,721,567 B1 * | 4/2004 | Wang et al. ................... | 455/440 |
| 6,750,813 B2 | 6/2004 | Vargas-Hurlston et al. | |
| 6,823,257 B2 | 11/2004 | Clapper | |
| 7,084,809 B2 | 8/2006 | Hockley, Jr. et al. | |
| 7,305,238 B2 | 12/2007 | Gabara | |
| 7,925,274 B2 | 4/2011 | Anderson et al. | |
| 8,477,742 B2 | 7/2013 | Grilli et al. | |
| 2004/0203779 A1 * | 10/2004 | Gabara ......................... | 455/436 |
| 2005/0037775 A1 | 2/2005 | Moeglein et al. | |
| 2005/0037786 A1 | 2/2005 | Edge | |
| 2008/0274753 A1 | 11/2008 | Attar et al. | |
| 2008/0287141 A1 | 11/2008 | Vogel et al. | |
| 2008/0316091 A1 | 12/2008 | Wigren et al. | |
| 2009/0058720 A1 * | 3/2009 | Shaw et al. ................ | 342/357.1 |
| 2009/0273518 A1 | 11/2009 | Duffet-Smith et al. | |
| 2010/0178934 A1 | 7/2010 | Moeglein et al. | |
| 2010/0234043 A1 | 9/2010 | Wigren et al. | |
| 2011/0059756 A1 | 3/2011 | Moeglein et al. | |
| 2011/0164607 A1 | 7/2011 | Farmer | |

(Continued)

FOREIGN PATENT DOCUMENTS

| | | |
|---|---|---|
| EP | 1209930 A2 | 5/2002 |
| EP | 2073486 A1 | 6/2009 |
| WO | WO-2009098432 A1 | 8/2009 |
| WO | WO-2011163059 A1 | 12/2011 |

OTHER PUBLICATIONS

Venkatachalam, et al., "Location Services in WiMAX Networks," WiMax Update, IEEE Communications Magazine, pp. 92-98, Oct. 2009.

(Continued)

*Primary Examiner* — Omoniyi Obayanju
(74) *Attorney, Agent, or Firm* — Berkeley Law & Technology Group, LLP

(57) ABSTRACT

Examples disclosed herein may relate to determining an expected route of a mobile device based, at least in part, on information generated by a navigation application hosted by the mobile device. Examples disclosed herein may further relate to determining a subset of wireless transmitters from a plurality of wireless transmitters based at least in part on the expected route of the mobile device.

61 Claims, 8 Drawing Sheets

(56) References Cited

U.S. PATENT DOCUMENTS

2011/0246148 A1    10/2011  Gupta et al.
2012/0052874 A1*    3/2012  Kumar ..................... 455/456.1
2013/0235864 A1     9/2013  Do et al.

OTHER PUBLICATIONS

International Search Report and Written Opinion—PCT/US2012/049350—ISA/EPO—Oct. 1, 2012.

Polaris Wireless: "Content for TR 36.809 (Study on the inclusion of RF Pattern Matching Technologies as a location method in the E-UTRAN)", 3GPP Draft; R4E-110006, 3rd Generation Partnership Project (3GPP), Mobile Competence Centre; 650, Route Deslucioles; F-06921 Sophia-Antipolis Cedex; France, vol. Ran WG4, no. Electronic meeting; Aug. 26, 2011, Jun. 9, 2011, 19 Pages, XP050544581, [retrieved on Jun. 9, 2011] p. 7-p. 10.

* cited by examiner

US 8,812,019 B2

PROVIDING WIRELESS TRANSMITTER ALMANAC INFORMATION TO MOBILE DEVICE BASED ON EXPECTED ROUTE

BACKGROUND

1. Field

The subject matter disclosed herein relates to determining wireless transmitter almanac information to transmit to a mobile device, and more particularly to basing such determinations on expected contributions of one or more wireless transmitters to a future navigation operation for the mobile device.

2. Information

The position of a mobile device, such as a cellular telephone, may be estimated based on information gathered from various systems. One such system may comprise a Global Navigation Satellite System (GNSS), which is one example of a satellite positioning system (SPS). SPS systems such as GNSS may comprise a number of space vehicles (SV) orbiting the earth. Another example of a system that may provide a basis for estimating the position of a mobile device is a cellular communication system comprising a number of terrestrial wireless transmitters/receivers, often referred to as "base stations," to support communications for a number of mobile devices. A further example of a system that may provide a basis for estimating the position of a mobile device is a wireless network compatible with one or more of the Institute of Electrical and Electronics Engineers (IEEE) 802.11 wireless local access network (WEAN) standards, which may also be referred to as a Wi-Fi network. Such a network may include wireless transmitters/receivers often referred to as "access points," for example.

A position estimate, which may also be referred to as a position "fix", for a mobile device may be obtained based at least in part on distances or ranges measured from the mobile device to one or more wireless transmitters, and also based at least in part on knowledge of the locations of the wireless transmitters. Such transmitters may comprise SVs in the case of an SPS, terrestrial base stations in the case of a cellular communications system, or Wi-Fi/802.11x access or points or other beacon transmitters, for example.

SUMMARY

In an aspect, an expected route of a mobile device may be determined based, at least in part, on information generated by a navigation application hosted by the mobile device. One or more messages comprising a request for identity or position information for a subset of wireless transmitters may be transmitted from a communication interface of the mobile to a network entity, in an aspect. Also, in an aspect, a subset of wireless transmitters may be determined based at least in part on the expected route of the mobile device, and the request for identity or position information may include one or more signals indicative of the expected route of the mobile device.

In a further aspect, an article may comprise a storage medium having stored thereon one or more instructions executable by a processor of a mobile device to determine an expected route of the mobile device based, at least in part, on information generated by a navigation application hosted by the mobile device. The article may have stored thereon further instructions executable by the processor of the mobile device to initiate a transmission from the mobile device to a network entity of one or more messages comprising a request for identity or position information for a subset of wireless transmitters to be determined based at least in part on the expected route of the mobile device, wherein the request for identity or position information includes information indicative of the expected route of the mobile device.

Additionally, in an aspect, a mobile device may comprise a processor to determine an expected route of the mobile device based, at least in part, on information generated by a navigation application hosted by the mobile device, the processor further to initiate transmitting one or more messages from a communication interface of the mobile device to a network entity, wherein the one or more messages comprise a request for identity or position information for a subset of wireless transmitters to be determined based at least in part on the expected route of the mobile device. In a further aspect, the request for identity or position information may include one or more signals indicative of the expected route of the mobile device.

In a further aspect, an apparatus may comprise means for determining an expected route of a mobile device based, at least in part, on information generated by a navigation application hosted by the mobile device. Also, in an aspect, an apparatus may comprise means for transmitting to a network entity one or more messages comprising a request for identity or position information for a subset of wireless transmitters to be determined based at least in part on the expected route of the mobile device. In an aspect, the request for identity or position information may include one or more signals indicative of the expected route of the mobile device.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
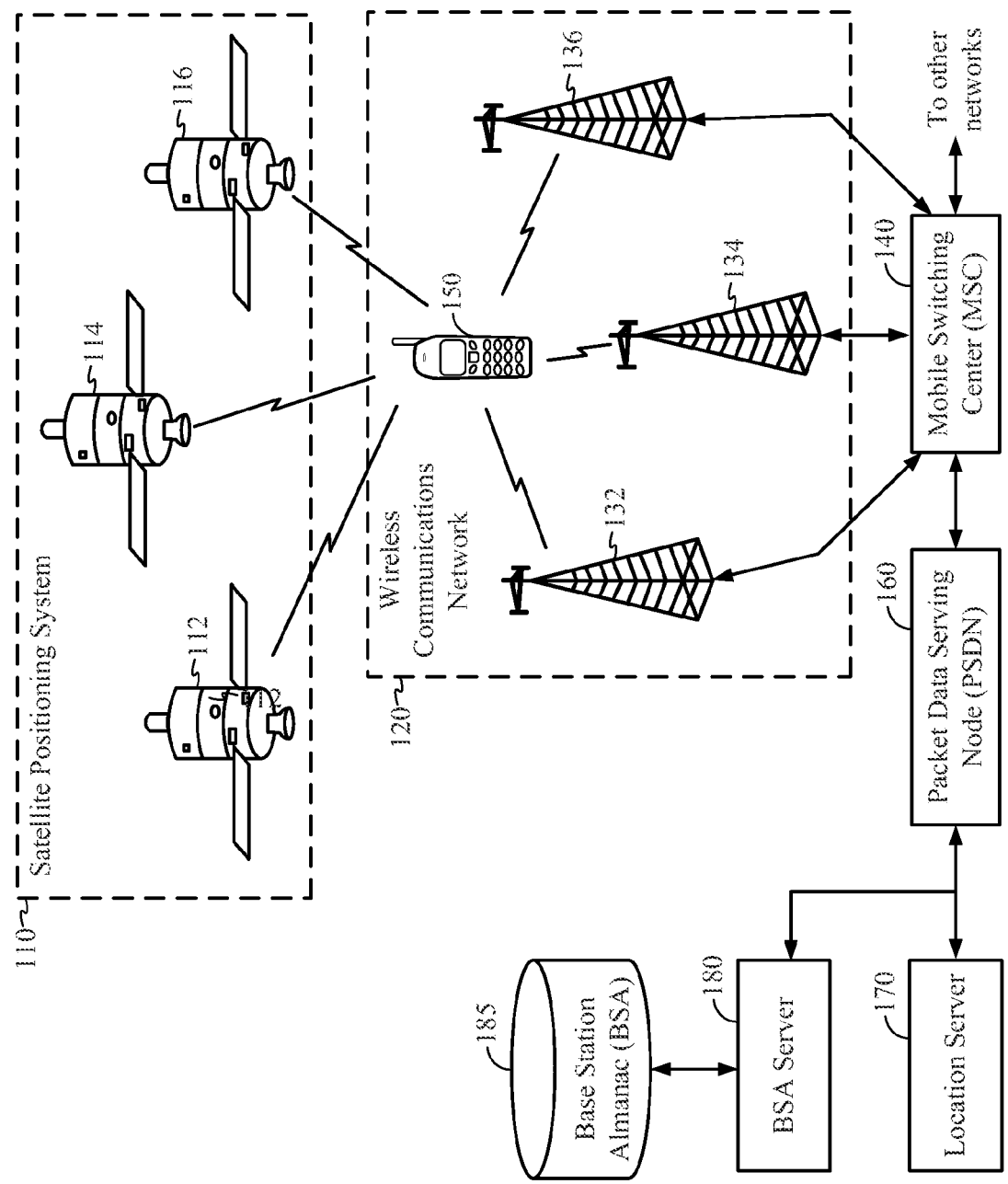
FIG. 1 is a schematic block diagram of an example satellite positioning system (SPS) and an example wireless communications network.

As discussed above, information in an almanac may be used to perform, at least in part, position estimation operations for mobile devices. A position estimate for a mobile device may be obtained based at least in part on distances or ranges measured from the mobile device to one or more transmitters such as space vehicles (SV), terrestrial base stations, or access points, for example, and also based at least in part on the locations of the one or more transmitters. A range to a transmitter may be measured based on one or more characteristics of one or more signals transmitted by the transmitter and received at the mobile device. Location and coverage area information of the transmitters may be ascertained, in at least some cases, based on the identities of the transmitters, and identities of the transmitters may be ascertained from signals received from the transmitters.

An almanac may be maintained for systems used for position estimation. The almanac may contain various types of information, including, for example, information that may be used in position estimation operations. Such information may include the identities and locations of various wireless transmitters of one or more wireless communications systems, for example. Information may also include coverage area information for various wireless transmitters or uncertainties for one or more parameters related to various wireless transmitters, in an aspect.

For some wireless communications systems, an almanac that stores information related to land-based transmitters may be referred to as a "base station almanac" (BSA). The terms "almanac" and "base station almanac" as used herein may be used interchangeably, and are meant to include any organized set of information related to a plurality of base stations or access points of a wireless communications network. A BSA may be stored in a memory of a computing platform, such as a BSA server, for example, or in a memory of mobile device, for another example. In another aspect, a BSA may be transmitted from a BSA server to one or more mobile devices.

In one aspect, a mobile device may use received almanac information to perform position estimation operations, for example by trilateration or multilateration, using information or measurements from a number of transmitters. A mobile device may also use received almanac information, in another aspect, to narrow a code phase search window for acquiring signals transmitted by an SPS in order to perform position estimation operations using, at least in part, measurements from signals received from one or more space vehicles (SV). For example, to narrow a search window, a mobile device may use BSA information to associate an identification of a cellular communication system sector currently serving the mobile device with an almanac entry. The entry may provide a location of the transmitter for the serving sector, from which an approximate location (within a couple of kilometers, for example) of the mobile device may be obtained.

Mobile devices may have a limited capacity for storing information, due at least in part to size and cost considerations. Also, wireless communication channels may have limited capacity. Therefore, it may be advantageous to provide a mobile device with almanac information it is more likely to utilize in position fix operations and to not provide the mobile device with information it is unlikely to utilize. In this manner, the amount of almanac information to be stored at the mobile device may be kept within limits imposed by storage capacity, and the amount of communication channel capacity utilized in transmitting almanac information may be reduced. Furthermore, any reduction in the amount of data sent or received by mobile device may reduce mobile device power consumption and may therefore increase battery life.

In an aspect, to determine appropriate almanac information to download to a mobile device, navigation information may be utilized to identify wireless access points or base stations that may be positioned along a planned or expected route for the mobile device. For example, if a user is planning to travel to a new location, the user may tend to utilize a navigation application executed by the mobile device. For example, a route may be planned between a starting position and a destination. Because this may be a new location for the user, the user's mobile device may not have previously downloaded almanac information for wireless access points located along the planned route to the new location. Information generated by the navigation application may be utilized by the mobile device to identify wireless access points that may be located along the planned or expected route, and appropriate almanac information may be transmitted to the mobile device in anticipation of entering a new area.

In an aspect, a subset of a plurality of wireless access points may be determined based, at least in part, on an expected route of a mobile device. An expected route of a mobile device may be determined based, at least in part, on inferences generated by a navigation application executed by a processor of the mobile device. In an aspect, an expected route may comprise a route between a starting or current position of a mobile device and a destination location that may be planned by a navigation application executed by a processor of the mobile device. In a further aspect, one or more signals indicative of a request for almanac information may be transmitted from a communication interface of the mobile device to a network entity. Also in an aspect, a request for almanac information may comprise information related to an expected route of a mobile device determined by a navigation application executed by a processor of the mobile device or by another network entity. Further, in an aspect, a network entity may determine a subset of wireless access points of a plurality of wireless access points based, at least in part, on information related to the expected route of the mobile device received from the mobile device. The network entity may further provide almanac information associated with the determined subset of wireless access points, in an aspect. An amount of almanac information delivered to a mobile device may further be limited by a specified maximum amount, in an aspect, although the scope of claimed subject matter is not limited in this respect. In this manner, the mobile device has stored thereon almanac information it is most likely to utilize in performing position fix operations, and the amount of extraneous information delivered to the mobile device and stored thereon may be reduced. Also, the amount of communication channel capacity utilized to deliver the almanac information to the mobile device may be reduced.

FIG. 1 is a schematic block diagram of an SPS 110 and a wireless communications network 120 in communication with a mobile device 150. Wireless communications network 120, for this example, may comprise a cellular communications network capable of enabling voice communication for a number of mobile devices including mobile device 150, for example, and may further support position estimation for the mobile devices in addition to providing voice communication. Wireless communications network 120 may comprise any of a number of network types, several examples of which are described below. Wireless communications network 120 for this example comprises base stations 132, 134, and 136 that provide communication for a number of wireless terminals such as, for example, mobile device 150. For simplicity, only a few base stations 132, 134, and 136 are depicted and a single mobile device 150 is depicted in FIG. 1. Of course, other examples may include additional numbers of base stations, and the configuration of base stations depicted in FIG. 1 is merely an example configuration. Also, wireless communications network 120 is merely an example wireless communications system, and the scope of claimed subject matter is not limited in this respect.

As used herein, the terms "wireless transmitter" and "wireless access point" are interchangeable, and are meant to include any wireless communication station or device used to facilitate communication in a wireless communications system, such as, for example, a cellular network, although the scope of claimed subject matter is not limited in this respect. An example type of wireless transmitter or access point utilized in a cellular network may be referred to as a base station. In another aspect, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet. In another aspect, wireless transmitters may be included in any of a range of electronic device types. In an aspect, a wireless transmitter may comprise a wireless local area network (WLAN) access point, for example. Such a WLAN may comprise a network that is compatible with one or more of the IEEE 802.11x standards, in an aspect, although the scope of claimed subject matter is not limited in this respect. Additionally, the use of the term "transmitter" in describing a device does not limit that device's function to transmitting only. For example, base stations and access points are typically capable of both transmitting and receiving wireless signals. Also, as used herein, the term "wireless access point" may refer to WLAN access points compatible with one or more of the IEEE 802.11x standards, for example, and may also refer to cellular base stations, in an aspect.

As used herein, the term "mobile device" refers to a device that may from time to time have a position that changes. Such changes in position may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, or other portable communication devices. A mobile device may also comprise a processor or computing platform adapted to perform functions controlled by machine-readable instructions.

In an aspect, SPS 110 may comprise a number of SVs, for example SVs 112, 114, and 116. For an example, SPS 110 may comprise one or more satellite positioning systems, such as GPS, GLONASS and Galileo, although the scope of claimed subject matter is not limited in this respect. In one or more aspects, mobile device 150 may receive signals from SVs 112, 114, and 116, and may communicate with one or more of base stations 132, 134, and 136. For example, mobile device 150 may obtain one or more measurements from one or more signals received from one or more of the SVs or base stations. However, in some circumstances timing signals from an SPS may not be available. In such a circumstance, mobile device 150 may gather propagation delay information through communication with one or more of base stations 132, 134, or 136. Mobile device 150 may calculate a position for the mobile device based, at least in part, on timing calibration parameters received through communication with one or more of base stations 132, 134, or 136, and further based, at least in part, on known locations of the base stations. Mobile device 150 may also make use of an estimated non-line-of-sight propagation delay for signals received from a base station source, a satellite source, or both, to correct range measurements to such sources.

In another aspect, position determination calculations may be performed by a network entity such as, for example, location server 170 depicted in FIG. 1, rather than at mobile device 150. Such a calculation may be based, at least in part, on signals acquired by mobile device 150 from one or more of base stations 132, 134, or 136. In a further aspect, location server 170 may transmit the calculated position to mobile device 150.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example may provide coordination and control for the base stations coupled to it and may further control routing of messages to/from the mobile devices served by these base stations. For the example depicted in FIG. 1, PDSN 160 may couple MSC 140 to location server 170 and to a BSA server 180. Location server 170 may collect and format base station location information, provide assistance to mobile devices for position estimation, or perform computations to obtain position estimates for the mobile devices. BSA server 180 may manage a BSA 185, which for this example may store a hierarchal base station almanac for wireless communications network 120. An example of a hierarchal base station almanac is presented below in connection with FIG. 5.

In one aspect, BSA server 180 may provide almanac information to mobile device 150. Information to be provided to mobile device 150 may comprise a subset of BSA 185 selected based, at least in part, upon an expected route for mobile device 150. In an aspect, an expected route for mobile device 150 may be determined by a navigation application executed by a processor of mobile device 150. In an aspect, an expected route may comprise a route between a starting or current position of mobile device 150 and a destination location specified by a user. An expected route between a starting position and a destination position may be based, at least in part, on a shortest possible route between a starting position and a destination position, for example, or on a shortest transit time, for another example, although claimed subject matter is not limited in scope in these respects. In an aspect, an expected route for mobile device 150 may comprise a route selected by a user, for example. Information related to an expected route for mobile device 150 may be transmitted by mobile device 150 to a network entity, such as location server 170 or BSA server 180, for example, to determine a subset of wireless access points that the mobile device is likely to acquire as the mobile device travels along the expected route. The term "acquire" as used herein as it relates to wireless signals received at a mobile device refers to a mobile device obtaining sufficient signal attributes or symbols from a wireless signal to enable processing of the received wireless signal to obtain at least some information therein. Example types of information that may be obtained by a mobile device in acquiring a wireless signal may include, but are not limited to, carrier frequency, radio-frequency (RF) phase, code, code-phase, timing, messages, transmitter identifier, or Doppler shift, to list but a few examples. Further, it should be noted that the scope of claimed subject matter is not limited to any particular technique for acquiring a wireless signal.

To determine a subset of wireless access points that mobile device 150 is likely to acquire as mobile device 150 travels along an expected route, a network entity, such as location server 170 or BSA server 180, may determine relationships between coverage areas for individual wireless access points and an expected route for mobile device 150. For example, in an aspect, a determination may be made as to whether an estimated or measured coverage area for an individual wireless access point intersects an expected route for mobile device 150. In another aspect, such a determination may be based, at least in part, on a historical observation frequency of individual wireless access points for mobile devices traveling along an expected route. In a further aspect, such a determination may be based, at least in part, on a proximity of individual wireless access points to the expected route of the mobile device. Additionally, a determination of the subset of wireless access points may be based, at least in part, on one or more authorizations for the mobile device to communicate with one or more networks associated with individual wireless access points, in an aspect. However, claimed subject matter is not limited in scope in these respects.

In another aspect, information to be provided to mobile device 150 may comprise a subset of BSA 185 selected based, at least in part, on one or more additional parameters specified by mobile device 150. Such parameters may include one or more networks, sub-networks, or communications or SPS protocols specified by mobile device 150, an amount of available storage space for mobile device 150, indications of particular categories or types of information for individual wireless access points specified by mobile device 150, or the granularity of the data, to name but a few examples. Of course, claimed subject matter is not limited in scope in this respect.

Figure 2:
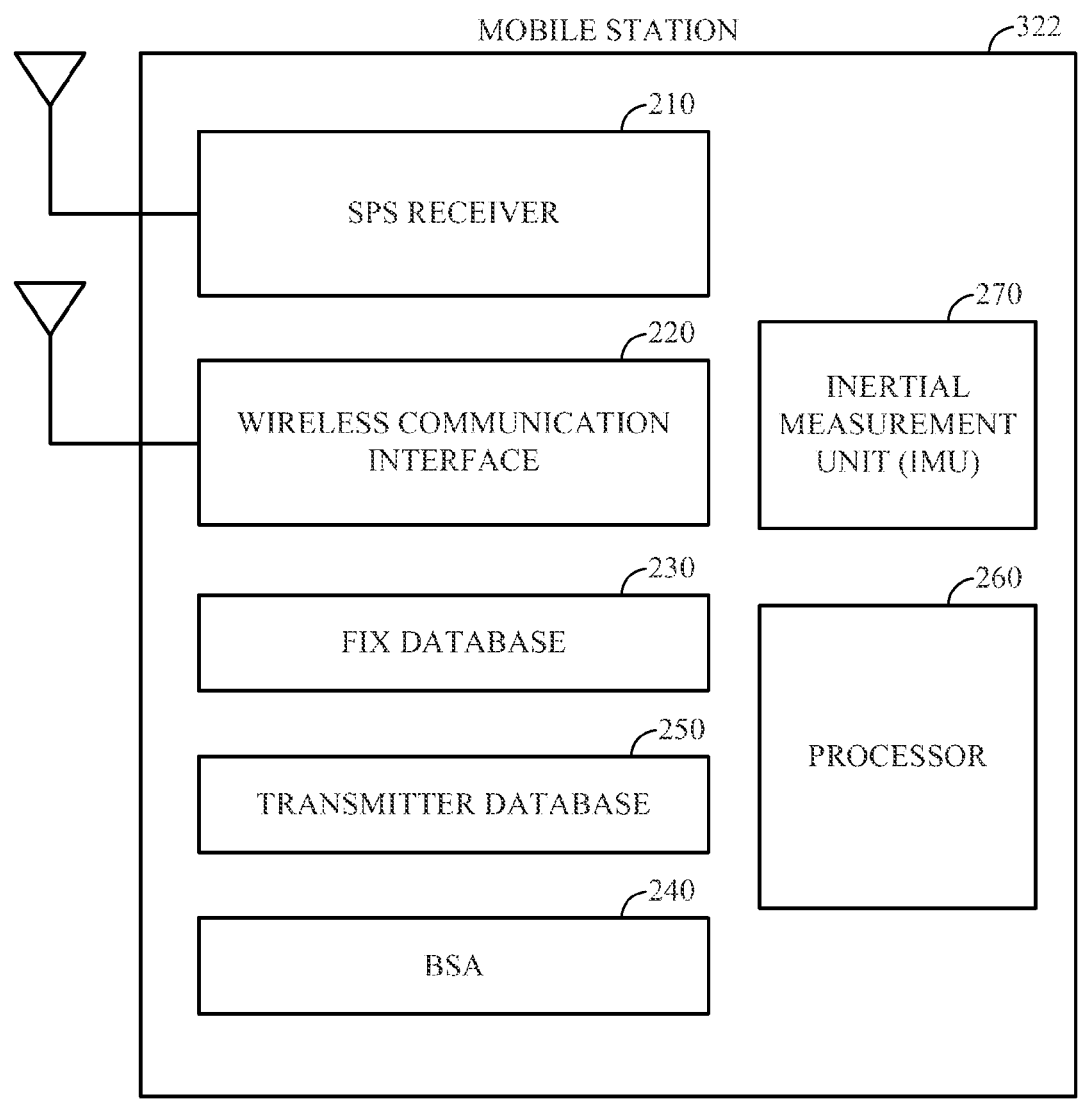
FIG. 2 is a schematic block diagram illustrating an example mobile device.

FIG. 2 is a schematic block diagram of an example implementation of a mobile device 322. In an aspect, mobile device 322 may comprise an SPS receiver 210 and a wireless communication interface 220. Thus, mobile device 322 may receive signals from one or more SPS such as SPS 110 and may receive from or transmit to one or more terrestrial wireless networks, such as wireless communications network 120, which may comprise a cellular network in an aspect, or may comprise a WLAN, in another aspect. In another aspect, mobile device 322 may further comprise a memory device that is partitioned, in one example, to store position fix information in a fix database 230 and to store base station almanac information in a base station almanac (BSA) 240.

Fix information stored in fix database 230 may comprise information gathered in the course of position fix operations. Such position fix information may be stored in wireless transmitter database 250 of mobile device 322 in what may be referred to as a "fix database" in which the fix information is organized or indexed according to particular instances of position fixes. Fix information may also be stored in a wireless transmitter database 250 in which fix information may be organized or indexed according to particular wireless transmitters observed or identified during position fix operations. In a further aspect, mobile device 322 may comprise one or more sensors that for this example are incorporated into Inertial Measurement Unit (IMU) 270 that may be utilized in dead-reckoning navigation operations, for example. Mobile device 322 further comprises processor 260, for this example. Of course, this is merely one example of a configuration of a mobile device, and the scope of claimed subject matter is not limited in this respect.

In an aspect, locations of a plurality of wireless access points may be stored in a network entity such as BSA server 180 in wireless communications network 120, or may be stored in any of a wide range of other resources in the wireless network. Further, for an example, location information for wireless access points may comprise longitude and latitude components, and may for another example also comprise an altitude component. However, the scope of claimed subject matter is not limited in these respects. In another aspect, some wireless access points may broadcast their positions, and the positions of such wireless access points may be stored in one or more databases in a mobile device, such as in wireless transmitter database 250 of mobile device 322. Wireless access point positions stored at a mobile device may be shared with other network entities, such as an assistance server or location server such as location server 170 of FIG. 1, for example.

Further, in an additional aspect, BSA 240 may have stored therein a subset of a larger BSA database, such as BSA 185 of FIG. 1, for example. In an aspect, a network entity such as location server 170 or BSA server 180 may determine which of a plurality of wireless transmitters associated with information stored in BSA 185 have locations that are within a specified range of an expected route for mobile device 322. As mentioned previously, a network entity such as location server 170 or BSA server 180 may, in an aspect, base a determination of a subset of wireless access points at least in part on a coverage area as it relates to an expected route for the mobile device for individual wireless access points. In another aspect, a network entity may base a determination of a subset of wireless access points, at least in part, on a historical observation frequency of individual wireless access points for mobile devices traveling along an expected route, or portion thereof. In a further aspect, the determination may be based, at least in part, on a proximity of individual wireless access points to an expected route of mobile device 322. Additionally, in an aspect, a determination of a subset of wireless access points may be based, at least in part, on whether a mobile device is authorized for two-way communication with individual wireless access points of the plurality of wireless access points. For example, a user may subscribe to one or more particular wireless network providers, and such providers may maintain one or more wireless access points. A mobile device associated with the user may authorized for two-way communication with the wireless access points maintained by the one or more particular wireless network providers subscribed to by the user. Further, in an aspect, a determination of a subset of wireless access points may be based, at least in part, on whether one or more wireless access points maintained by the one or more wireless network providers are positioned along an expected route for a mobile device. However, claimed subject matter is not limited in scope in these respects.

In an aspect, in order for a network entity such as location server 170 or BSA server 180 to determine a subset of wireless access points based on an expected route for mobile device 322, a network entity may receive one or more messages from mobile device 322. As mentioned above, mobile device 322 may collect information related to position fix operations in fix database 230, including identities and positions of wireless access points observed during position fix operations. Information related to specific wireless access points may be stored, for one example implementation, in wireless transmitter database 250. Information stored in fix database 230 or wireless transmitter database 250 may be provided to the network entity, such as to location server 170 or to BSA server 180, in an example implementation.

Figure 3:
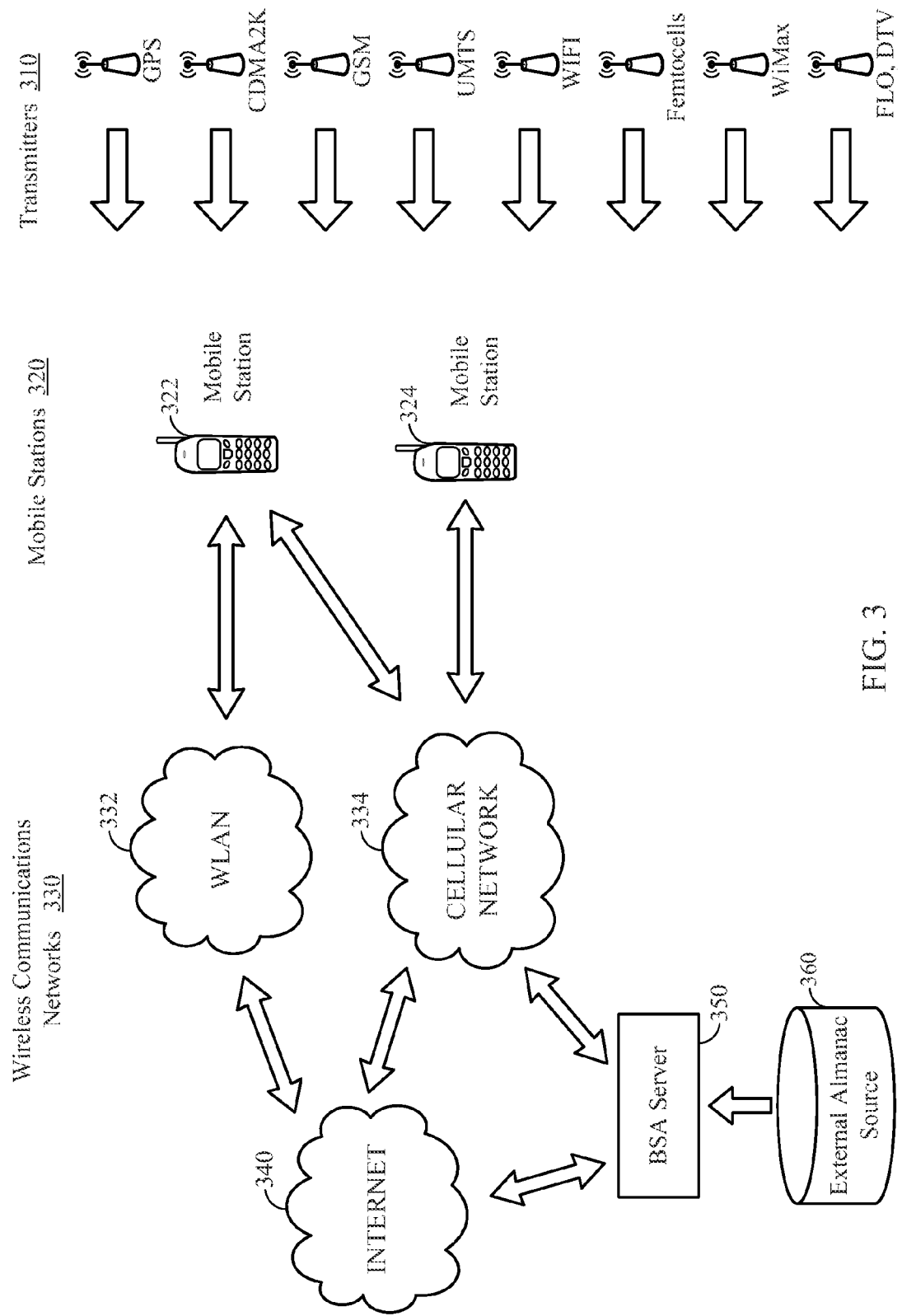
FIG. 3 is an illustration depicting an example almanac server in communication with a number of mobile devices via one or more wireless communications networks.

FIG. 3 is an illustration depicting an example base station almanac (BSA) server 350 in communication with a number of mobile devices 320 via one or more wireless communications networks 330, such as, for example, WLAN 332 and cellular network 334, and via Internet 340. For this example, mobile device 322 may represent a multimode device that may support communication with both packet-switched wireless local area network (WLAN) 332 and cellular network 334. Of course, these are merely examples of the types of wireless communications networks with which a multimode device may communicate, and the scope of claimed subject matter is not limited in this respect. Also for this example, mobile device 324 may represent a single mode device that may support communication with cellular network 334. Again, the cellular network is merely one example of a wireless communications network with which a mobile device may establish communication.

FIG. 3 further depicts a number of wireless transmitter types 310 that mobile devices 320 may monitor. Mobile devices 320 may or may not be subscribed to any given network associated with the various respective transmitter types to be able to monitor signals transmitted from the various transmitter types. Therefore, access point locations provided to the mobile devices by a network entity may or may not include locations associated with access points belonging to networks to which the mobile devices are not subscribed. Mobile devices may specify particular networks or particular transmitter types if making requests for almanac information. For the example of FIG. 3, one or more of mobile devices 320 may request almanac information comprising at least a subset of a BSA from BSA server 350. In a further aspect, processor 260 of mobile device 322 may initiate receiving wireless transmitter almanac information from a network entity, such as from BSA server 350.

In another aspect, BSA server 350 may obtain a BSA from an external almanac source 360. For example, a cellular network provider may contract with a third party to develop or provide one or more records including locations or identities of one or more wireless access points to BSA server 350. At least a subset of the records provided to BSA server 350 may eventually be transmitted to one or more of mobile devices 320, in an aspect. In a further aspect, BSA server 350 may receive BSA information from one or more of mobile devices 320 as one or more of mobile devices 320 develop such information at least in part through monitoring signals transmitted from one or more of example transmitters 310. Additionally, in another aspect, one or more of mobile devices 320 may select whether externally-provided BSA information should be delivered to the mobile device in response to the mobile device making such request or whether BSA information originally developed at least in part by the mobile devices should be delivered. In a further aspect, one or more of mobile devices 320 may select a combination of information from external and local sources. In a further aspect, a processor of a mobile device may initiate receiving wireless transmitter almanac information from a network entity. For example, processor 260 may initiate receiving one or more messages comprising wireless transmitter almanac information from BSA server 350, although claimed subject matter is not limited in scope in this respect.

Although the example of FIG. 3 depicts two mobile devices, in practice a wide variety of mobile device types exhibiting a wide range of different functionalities or storage capabilities may be utilized to communicate with a large variety of potential network types. Further, the mobile devices may exhibit a wide range of different usage patterns. Therefore, it may be advantageous for BSA server 350 to provide individualized subsets of BSA information that the individual mobile devices may require or request, and it may be further advantageous to provide such information formatted in a flexible manner according to a specified file size, coverage area, or transmitter type, to name but a few examples of parameters that may be specified. In one aspect, these parameters may be specified by the mobile devices.

In an additional aspect, wireless access points whose information is to be included in the BSA information provided to a requesting mobile device may be determined according to the proximity of individual wireless access points to a current expected route of the requesting mobile device. The idea behind this technique for determining which BSA information to provide to a requesting mobile device is that the requesting mobile device may be more likely to acquire signals in the relatively near future for those wireless access points whose coverage areas intersect the expected route of the mobile device. In an aspect, an expected route for a mobile device may be partitioned into two or more segments, and identity or position information related to wireless access points with coverage areas that intersect one or more expected route segments may be provided to the requesting mobile device. For one example, if an individual coverage area for a wireless access point intersects one or more expected route segments, or if one or more segments are wholly enclosed by the individual coverage area, the given wireless access point may have its identity or position information provided to the requesting mobile device. For yet another example, a determination of whether to include identity or position information for a given group of wireless access points in the information to be provided to a requesting mobile device may be made conditionally, based at least in part on data storage available in the requesting mobile device. For example, identity or position information for individual wireless access points or groups of wireless access points may be included, depending upon space availability, where information is added until a specified available storage space threshold is reached. An available storage space threshold may be specified based, for example, on a maximum size or upon a desired size of available data storage in the requesting mobile device. In cases when storage space may be limited and navigation coverage may be redundant, information to be provided to a mobile device may be based at least in part on a set of priorities specified by a mobile device, by a BSA provider, or by a combination of thereof. For example, if a mobile device is likely to have a clear view of the sky for SPS coverage and excellent wide area network (WAN) coverage, WLAN communications along the route may be less advantageous. In such a situation, WLAN access point almanac information may not be conveyed to a mobile device, or an amount of WLAN access point almanac information to be conveyed to a mobile device may be reduced. Likewise, in dense urban areas where SPS and WAN signals may suffer from poor availability and/or long multipath, WLAN navigation operations may be more desirable, and therefore WLAN access point almanac information may be more desirable.

In examples described herein, a mobile device such as mobile device 322 may be described as requesting almanac information from BSA server 350. In response to receiving the request from mobile device 322, BSA server 350 may access position or identity information for a subset of wireless access points and may transmit one or more messages containing the position or identity information to mobile device 322. However, there may be a number of variations to these examples, in that there may be various techniques to communicate wireless access point identity or position information to mobile device 322. In some cases, the technique used may depend at least in part on a particular type of air interface. In some air interfaces, a transmitting entity may also be able to store and forward its own almanac information or that of its neighbors. For example, referring to FIG. 1, base station 132 may store BSA information, and may forward at least a portion of that BSA information to mobile device 150 upon receiving a request from mobile device 150. Base station 132 may compress or encrypt the information in accordance with the examples mentioned above. In another aspect, base station 132 may authenticate mobile device 150 before granting the mobile device's request for BSA information. However, these are merely examples regarding almanac information, and the scope of claimed subject matter is not limited in these respects.

Figure 4:
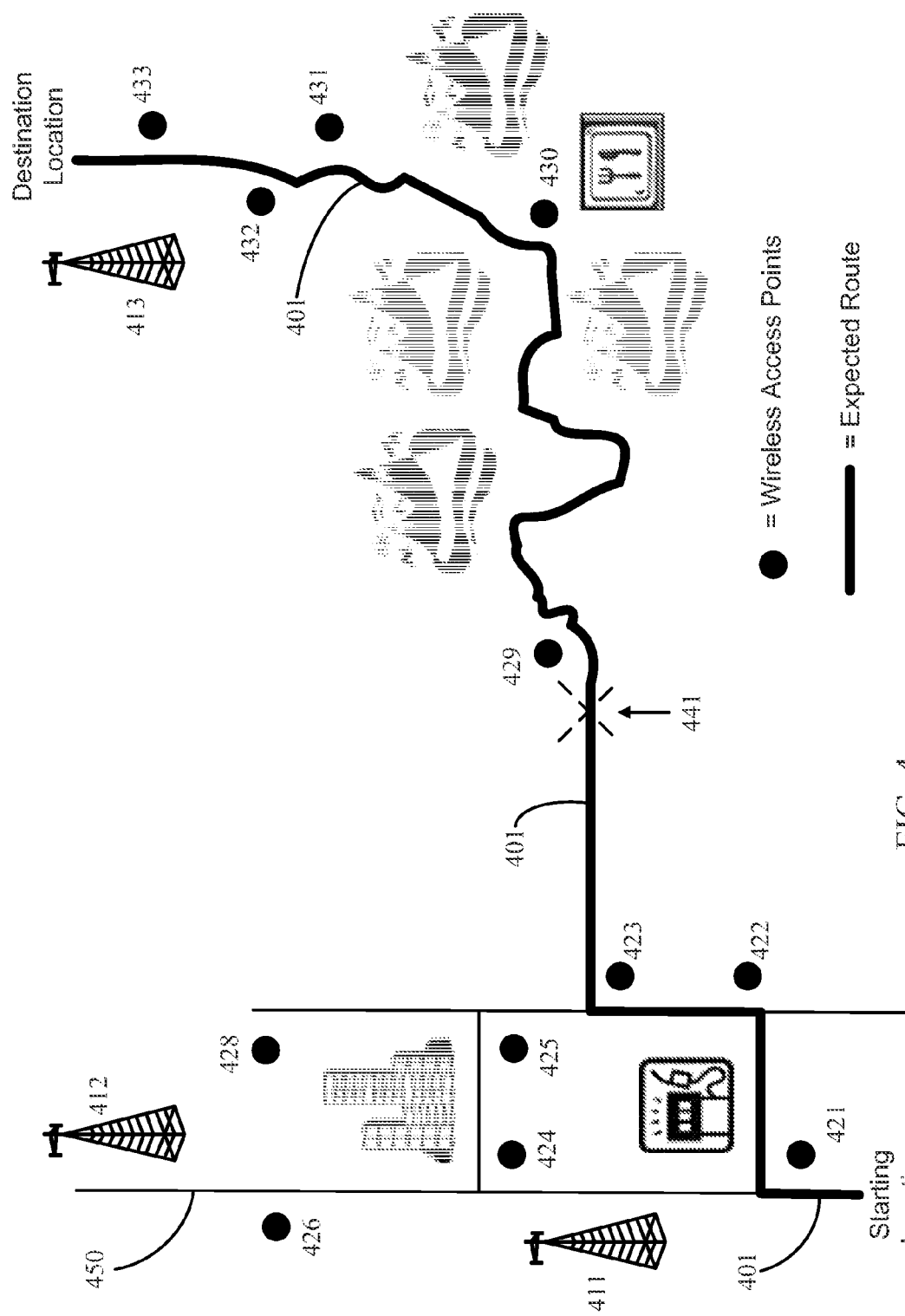
FIG. 4 is an illustration of a map depicting example locations for a number of wireless access points.

FIG. 4 is an illustration of a map depicting example locations for a number of wireless access points. For the example of FIG. 4, wireless access points are labeled 421, 422, 423, 424, 425, 426, 427, 428, 429, 430, 431, 432, and 433 (421-433). FIG. 4 also depicts cellular base stations 411, 412, and 413. Of course, the amounts and configurations of base stations 411-413 and for wireless access points 421-433 depicted in FIG. 4 are merely examples, and the scope of claimed subject matter is not limited in these respects. Also depicted in FIG. 4 is an expected route 401 for a mobile device, such as mobile device 322 depicted in FIG. 2. In the example depicted in FIG. 4, expected route 401 may comprise a route planned by a navigation application executed by a processor of mobile device 322. In an aspect, expected route 401 may comprise a route planned by a navigation application based at least in part on information provided by a user. For example, a user may designate a destination location, and mobile device 322 may determine a route to the destination from a current location of mobile device 322 or from a starting location specified by the user.

In an aspect, expected route 401 may be partitioned into two or more segments. A first segment may comprise a portion of expected route 401 that passes by access points 421, 422, and 423. A second segment may comprise a portion of expected route 401 that passes by wireless access points 429-433. Of course, this is merely an example partitioning scheme for an expected route, and claimed subject matter is not limited in this respect. In an aspect, a checkpoint 441 may be located between the first and second segments of expected route 401. In a further aspect, a checkpoint may comprise information indicative of a subset of wireless access point almanac information that may be requested by mobile device 322. For example, if mobile device 322 travels from the starting location of expected route 401 and arrives or approaches checkpoint 441, mobile device 322 may discern arriving at checkpoint 441 and may request almanac information associated with a subset of wireless access points whose coverage areas may intersect the second segment of expected route 401. In this manner, checkpoints may be utilized to signal to mobile device 322 to request further almanac information so that mobile device 322 may have almanac information appropriate for wireless access points that may be encountered along the next segment of the expected route. In an aspect, checkpoints may be designated base at least in part on any of a variety of factors, including, for example, such aspects as availability or cost of communication coverage at a checkpoint, distance or expected time between checkpoints, or an amount of almanac information to be stored in a mobile device between almanac information updates.

In an aspect, mobile device 322 may utilize almanac information associated with wireless access points positioned along expected route 401 to plan searches for WLAN access points, for example. If the almanac information indicates that no WLAN access points are available for a particular portion of expected route 401, mobile device 322 may turn off a searching function for wireless access points, and may instead rely on SPS navigation operations.

Additionally, almanac information associated with wireless access points positioned along expected route 401 may be utilized by mobile device 322 to display to a user locations at which WLAN access points may be available. For example, almanac information associated with wireless access points positioned along the second segment of expected route 401 may be utilized by mobile device 322 to indicate to the user that a wireless access point may be available at a restaurant associated with wireless access point 430, as depicted in FIG. 4. A user may plan a stop the restaurant to take advantage of the availability of wireless access point 430, for example.

In an aspect, for situations in which there is good wireless access point coverage, for example, mobile device 322 may turn off SPS navigation operations, and may rely on the wireless access points to provide signals for navigation operations. On the other hand, in an aspect, for a situation in which there is insufficient wireless access point coverage to support navigation operations, mobile device 322 may turn off wireless access point communications and my rely on SPS signals for navigation operations. For example, FIG. 4 depicts the second segment of expected route 401 passing through a mountainous region, where relatively few wireless access points are located. In such a situation, mobile device 322 may disable searching for wireless access points to reduce power consumption, and may utilize SPS signals to perform navigation operations.

In a further aspect, for situations in which mobile device 322 is traveling along a freeway, or along some other known and well-defined roadway, and is traveling in areas with cellular base station or wireless access point coverage sufficient to support navigation operations, it may not be necessary to utilize relatively highly accurate SPS navigation operations, for example. A navigation application executed on a processor of mobile device 322 access map information stored at mobile device 322 that may include information indicative of the known, well-defined roadway. Mobile device 322 may utilize map information related to the known, well-defined roadway along with signals received from one or more relatively lower-accuracy cellular base stations or wireless access points to perform navigation operations with desired accuracy. In such a situation, mobile device 322 may disable SPS reception in order to reduce power consumption. In an aspect, by providing mobile device 322 with appropriate almanac information, including wireless access point identities or positions, based on an expected route, mobile device 322 may take advantage of such almanac information in a variety of ways to improve power consumption or performance.

Additionally, in an aspect, cellular base stations such as base stations 411 and 412 located along a freeway 450, for example as depicted in FIG. 4, may broadcast encrypted signals designated for navigation purposes. Encrypted signals may be acquired and decrypted by mobile device 322 if mobile device 322 is authorized to utilize the encrypted signals (e.g., has possession of a decryption key). In an aspect, an encryption or decryption key may be made available to mobile device 322 on a subscription basis by a cellular communications network, for example. Such signals may comprise broadcast-only signals intended to provide the accuracy one might expect with SPS navigation operations, but with an additional advantage of higher power signals that may be easier to acquire for mobile device 322, and that may provide power consumption savings for mobile device 322. Of course, these are merely examples of types of almanac information that may be provided to a mobile device in response to a request for almanac information based at least in part on information related to an expected route for the mobile device, and the scope of claimed subject matter is not limited in these respects.

In a further aspect, a mobile device such as mobile device 322 may receive one or more messages from a network entity such as BSA server 350 that include relatively detailed map information corresponding to one or more regions along the expected route of mobile device 322 that may be determined to have reduced communication coverage. In an aspect, a determination related to regions of limited communication coverage may be made by a network entity such as BSA server 350, for example. In an additional aspect, mobile device 322 may receive the more detailed map information while mobile device 322 is within range of a network communication resource, such as a WLAN access point or a wireless WAN base station, for example. Further, in an aspect, mobile device 322 may receive the relatively detailed map information prior to mobile device 322 entering into one or more of the regions determined to have reduced communication coverage.

Figure 5:
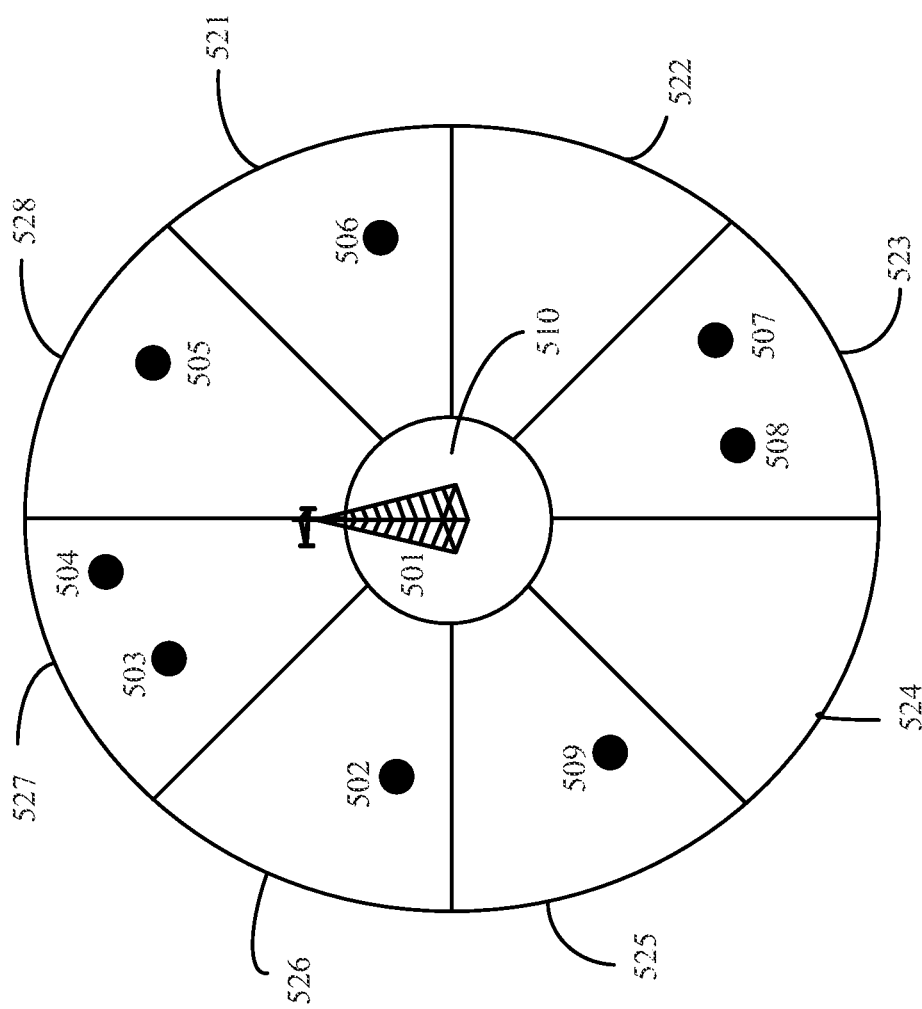
FIG. 5 is an illustration depicting an example almanac region partitioned into a plurality of chunks.

Additionally, in an aspect, a mobile device such as mobile device 322 may receive at wireless communication interface 220 one or more messages from a network entity such as BSA server 350 that include identity or position information for one or more wireless transmitters determined by BSA server 350 to comprise one or more wireless transmitters from which the mobile device may acquire relatively strong signals and with which mobile device 322 may establish communications as mobile device 322 travels along its expected route. In this manner, as mobile device 322 travels along its expected route, mobile device 322 may identify one or more transmitters with which to establish communications prior to mobile device 322 entering a proximity of the one or more transmitters. Also, in this manner, mobile device 322 need not rely on signal strength measurements taken from signals received from various transmitters to determine with which transmitters to establish communication FIG. 5 is an illustration depicting an example almanac region 500 partitioned into a plurality of chunks. Region 500, in an aspect, may represent a subset of almanac information associated with a cellular base station 501 and wireless access points 502-509, for example. In an aspect, region 500 may be partitioned into a number of pie-slice shaped chunks labeled 521, 522, 523, 524, 525, 526, 527, and 528, for example. In a further aspect, region 500 may also comprise a central chunk 510. Region 500, in an aspect, may provide a basis for organizing almanac information that may be stored at an almanac server and that may, at least in part, be transmitted to mobile device 322 upon an appropriate request from mobile device 322. For example, region 500 may be analogous to a coverage area of a base station whose identification parameters may be hierarchical in nature. In an aspect, individual chunks of region 500 may represent 2 kBytes of almanac information, although claimed subject matter is not limited in scope in this respect. For the example depicted in FIG. 5, a cellular base station 501 is depicted as being located within an area represented by central chunk 510. Wireless access point 506 is depicted as being located within an area represented by chunk 521, wireless access points 507 and 508 are depicted as being Located with an area represented by chunk 523, wireless access point 509 is depicted as being located within an area represented by chunk 526, wireless access points 503 and 504 are depicted as being located with an area represented by chunk 527, and wireless access point 505 is depicted as being located within an area represented by chunk 528. Of course, these are merely example relationships between access points and almanac information partitioned into chunks, and the scope of claimed subject matter is not limited in these respects.

In an aspect, if an expected route of mobile device 322 is determined to pass through one or more chunks of region 500, almanac information association with those chunks may be requested by mobile device 322. For example, at least in part in response to an expected route for mobile device 322 having been determined to pass through areas represented by chunks 526 and 527 of region 500, almanac information related to wireless access points 502, 503, and 504 may be requested by mobile device 322 and may be delivered to mobile device 322 by an almanac server. Of course, this is merely an example of how a subset of almanac information associated with a respective subset of wireless access points may be determined, and the scope of claimed subject matter is not limited in these respects.

Figure 6:
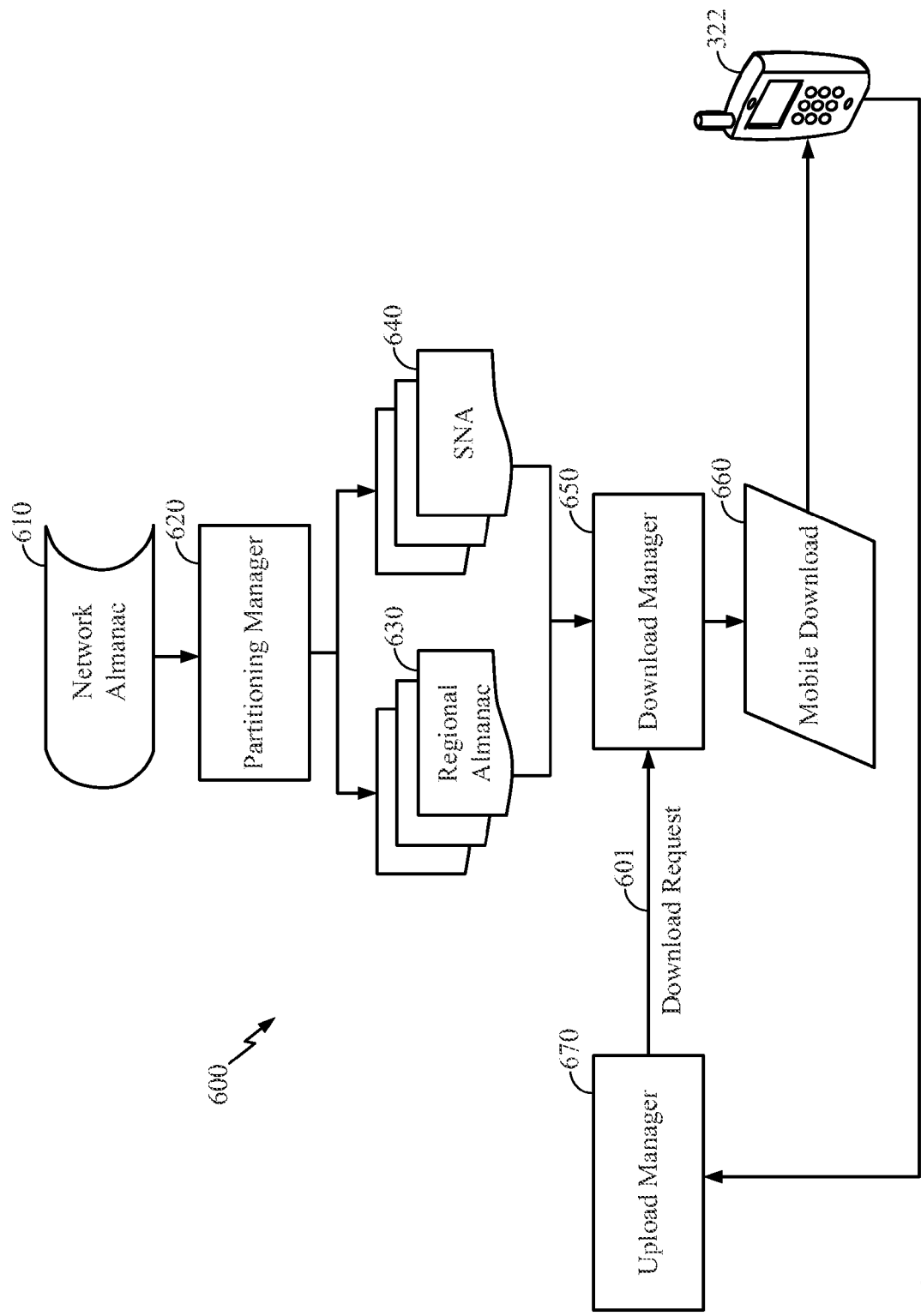
FIG. 6 is a schematic block diagram illustrating an example almanac server in one particular aspect.

FIG. 6 is a schematic block diagram illustrating an example process 600 for an example almanac server, in an aspect. In an additional aspect, FIG. 6 illustrates an example process for delivering a subset of a network almanac 610 to mobile device 322. In an aspect, network almanac 610 may comprise information related to a plurality of wireless access points. Network almanac 610 may comprise information, in an example implementation, for a plurality of wireless access points. However, the scope of claimed subject matter is not limited to any particular type of wireless transmitter. Network almanac 610 may store any of a wide range of information types for the plurality of access points, including, for example, locations for at least some of the wireless access points.

For the example process 600, a partitioning manager 620 may partition network almanac 610 into a number of regional almanac partitions 630 or a number of sparse network almanac (SNA) 640 partitions. A "sparse network almanac" may relate to an almanac comprising groupings of access points. The groupings may generally be associated with hierarchal identity elements for individual networks represented in the almanac and their underlying regions. Regional almanac partitions 630 may comprise more detailed information partitioned, as the name implies, according a geographic region. In an example embodiment, regional almanac partitions 630 may comprise one or more regions similar to region 500 depicted in FIG. 5 and discussed above. Of course, region 500 is merely an partition type for almanac information, and claimed subject matter is not limited in this respect.

Download manager 650, in an aspect, may determine which information to provide to mobile device 322 by way of a mobile download 660. In an aspect, download manager 650 may select information to provide to mobile device 322 based, at least in part, on information related to an expected route for mobile device 322 identifying a subset of wireless access points associated with information stored in network almanac 610. Examples related to determining subsets of wireless access points and associated almanac information based at least in part on an expected route for a mobile device are discussed above, for example, in connection with FIG. 5, although claimed subject matter is not limited in this respect.

Mobile device 322 may provide requests for network almanac information through an upload manager 670, in an aspect, and a download request signal 601 may be forwarded to download manager 650. Also, as mentioned previously, mobile device 322 may provide wireless access point information stored in fix database 230 or wireless transmitter database 250 to a network entity, which, for the example depicted in FIG. 6, may comprise upload manager 670. Upload manager 670 may further collect wireless access point information from a number of other mobile devices, and such information may be added to network almanac 610, in an aspect. In another aspect, as additional information is gathered from various mobile devices for at least some of the wireless access points represented in network almanac 610, information may be refined and made more accurate as additional points of reference are obtained.

In an embodiment, an application programming interface (API) may be provided for a navigation application through which information related to an expected route for mobile device 322 may be provided to enable mobile device 322 to request appropriate almanac information from an almanac server. In an aspect, an API may specify an expected route in a vector format. For example, specific locations, perhaps referred to as waypoints, may be indicated using longitude and latitude coordinates, with vectors between waypoints to complete an expected route. Another example implementation may include specifying an expected route by specifying distances to be traveled in specified directions on specified roads, for example. However, these are merely example techniques for specifying an expected route, and the scope of claimed subject matter is not limited in these respects.

Figure 7:
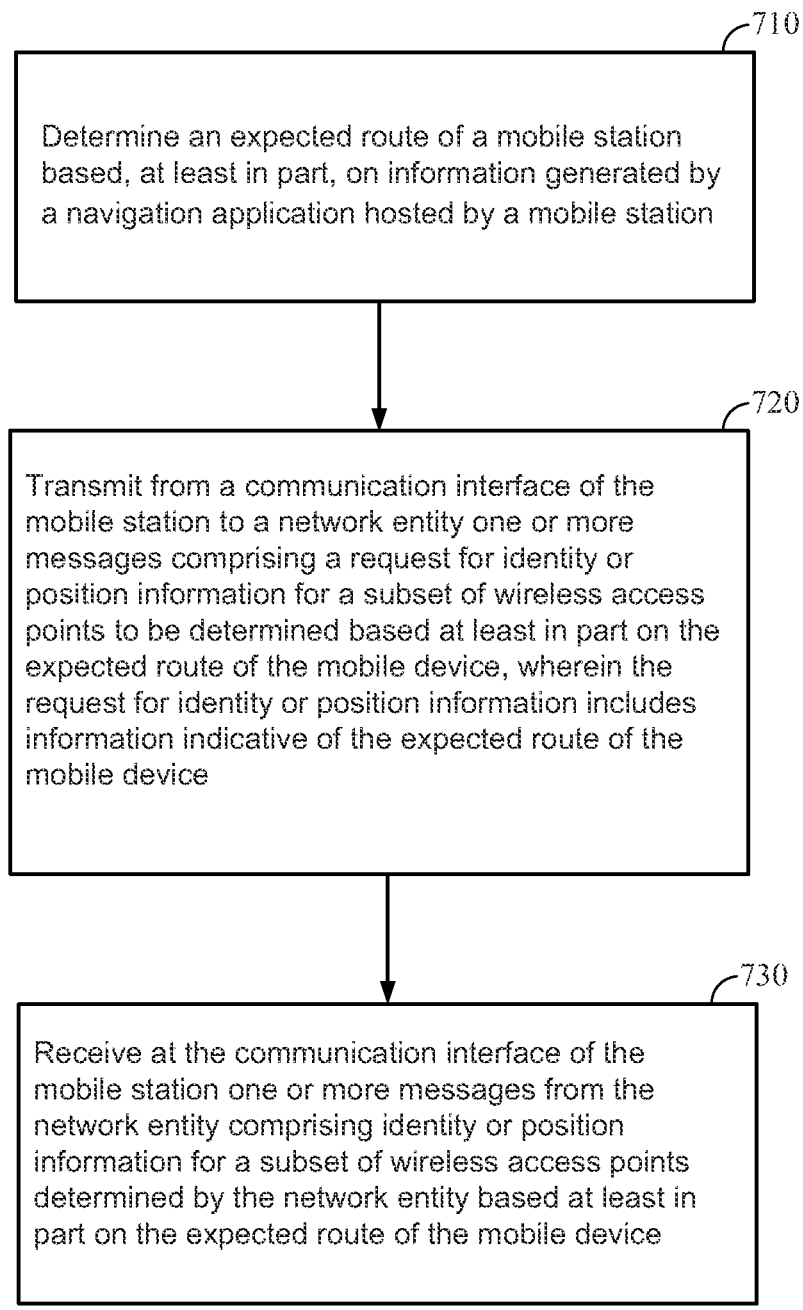
FIG. 7 is a flow diagram of an example process for determining a subset of wireless transmitter almanac information based, at least in part on an expected route of a mobile device.

FIG. 7 is a flow diagram of an example process for determining a subset of wireless transmitter almanac information based, at least in part on an expected route of a mobile device. In an aspect, at block 710, an expected route may be determined based, at least in part on information generated by a navigation application hosted by the mobile device. At block 720, one or more messages comprising a request for identity or position information for a subset of wireless transmitters to be determined based at least in part on the expected route of the mobile device may be transmitted from a communication interlace of the mobile device to a network entity. In an aspect, the request for identity or position information may include one or more messages comprising information indicative of the expected route of the mobile device. In a further aspect, one or more messages may be received at the communication interface of the mobile device from the network entity. In an aspect, the one or more messages may comprise identity or position information for a subset of wireless transmitters determined by the network entity based at least in part on the expected route of the mobile device, as depicted at block 730. Examples in accordance with claimed subject matter may include less than, all of, or more than blocks 710-730. Further, the order of blocks 710-730 is merely an example order, and claimed subject matter is not limited in these respects.

In a further aspect, an example process may comprising receiving at the communication interface of the mobile device one or more signals transmitted by the network entity indicative of the requested almanac information associated with the determined subset of wireless transmitters, and may also comprise the mobile device storing the one or more signals indicative of the requested almanac information in a memory. Additionally, in an aspect, the one or more signals indicative of the almanac entries may comprise signals indicative of almanac entries fitting within a specified maximum transmission size. Further, an example process may comprise determining the subset of wireless transmitters based, at least in part, on a coverage area as it relates to the expected route for individual wireless transmitters, or on a historical observation frequency of individual wireless transmitters for mobile devices traveling along the expected route, in an aspect. In a further aspect, determining the subset of wireless transmitters may be based, at least in part, on a proximity of individual wireless transmitters to the expected route of the mobile device, or may be based, at least in part, on one or more authorizations for the mobile device to communicate with one or more networks associated with individual wireless transmitters of the plurality of wireless transmitters, for example.

In another aspect, an example process may comprise determining the expected route of the mobile device based, at least in part, on information generated by the navigation application executed by the processor of the mobile device indicative of a planned route for the mobile device as selected by a user. In another aspect, an additional request for almanac information associated with the determined subset of wireless transmitters may comprise a request for almanac information partitioned according to one or more regions, wherein the one or more regions are individually partitioned into a plurality of chunks, for an example process. For example, one or more regions may comprise circular areas, and a plurality of chunks may comprise one or more pie-slice areas and a circular center area, in an aspect. Further, in an aspect, determining the subset of wireless transmitters from the plurality of wireless transmitters may comprise determining one or more of the plurality of chunks for the one or more regions that are traversed by the expected route.

In an additional aspect, an example process may comprise determining one or more checkpoints along an expected route of a mobile device. The determined one or more checkpoints may partition the expected route into a plurality of segments, wherein the one or more checkpoints may indicate to the mobile device to transmit an additional request for a next set of wireless transmitter identity or position information associated with one or more chunks of one or more regions that may be traversed by a next segment of the expected route, for an example process. In a further aspect, a mobile device may turn off a satellite positioning system function within the mobile device at least in part in response to the received almanac information indicating sufficient wireless transmitter coverage to allow for positioning operations to be performed using wireless transmitters located along the expected route.

Figure 8:
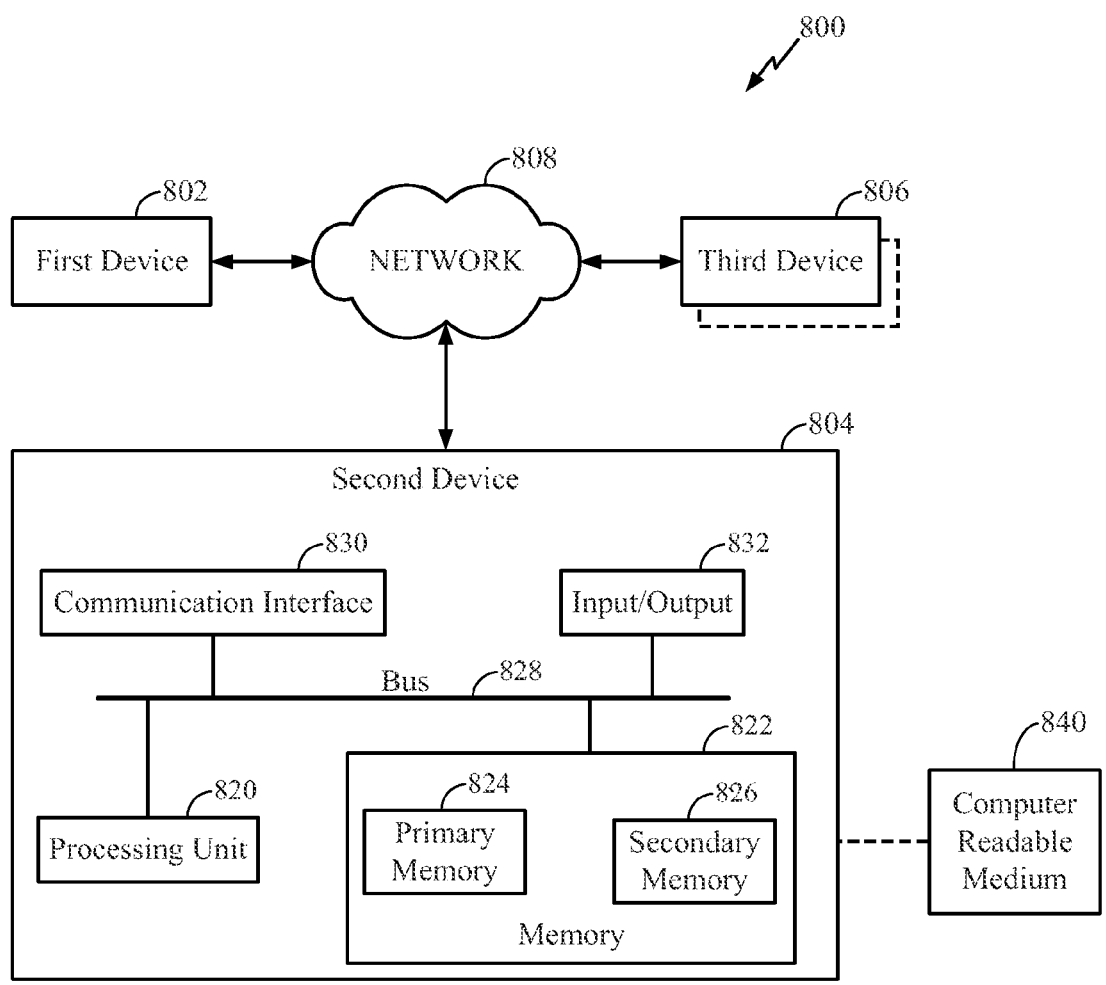
FIG. 8 is a schematic block diagram of an example computing platform.

FIG. 8 is a schematic diagram illustrating an example system 800 that may include one or more devices configurable to implement techniques or processes described above, for example, in connection with example techniques for determining almanac information to provide to a mobile device and for transmitting the almanac information, depicted in FIGS. 1-7. System 800 may include, for example, a first device 802, a second device 804, and a third device 806, which may be operatively coupled together through a wireless communications network 808. In an aspect, first device 802 may comprise an almanac server or a location server, for example. Second and third devices 804 and 806 may comprise mobile devices, in an aspect. Also, in an aspect, wireless communications network 808 may comprise one or more wireless access points, for example. However, claimed subject matter is not limited in scope in these respects.

First device 802, second device 804 and third device 806, as shown in FIG. 8, may be representative of any device, appliance or machine that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 802, 804, and 806, respectively, may comprise one or more of a base station almanac server, a base station, or a mobile device in accordance with the examples described herein.

Similarly, wireless communications network 808, as shown in FIG. 5, is representative of one or more communication links, processes, or resources configurable to support the exchange of data between at least two of first device 802, second device 804, and third device 806. By way of example but not limitation, wireless communications network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to wireless communications network 808.

It is recognized that all or part of the various devices and networks shown in system 800, and the processes and methods as further described herein, may be implemented using or otherwise including hardware, firmware, software, or any combination thereof.

Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
determining an expected route of a mobile device based, at least in part, on information generated by a navigation application hosted by the mobile device;
transmitting one or more messages from a communication interface of the mobile device to a network entity comprising a request for identity or position information for a subset of wireless transmitters to be determined based at least in part on the expected route of the mobile device, wherein the request for identity or position information includes information indicative of the expected route of the mobile device;
receiving at the communication interface of the mobile device one or more messages from the network entity comprising identity or position information for the subset of wireless transmitters determined by the network entity based at least in part on the expected route of the mobile device; and
removing power from a satellite positioning system function within the mobile device at least in part in response to receiving one or more messages from the network entity comprising identity or position information for a subset of wireless transmitters sufficient to allow for navigation operations to be performed using wireless transmitters located along the expected route.

2. The method of claim 1, further comprising storing one or more signals indicative of the identity or position information for the subset of wireless transmitters determined by the network entity in a memory of the mobile device.

3. The method of claim 1, wherein said receiving at the communication interface of the mobile device one or more messages from the network entity comprising identity or position information for the subset of wireless transmitters comprises receiving one or more messages comprising identity or position entries fitting within a specified maximum transmission size.

4. The method of claim 1, wherein said receiving at the communication interface of the mobile device one or more messages from the network entity comprising identity or position information for a subset of wireless access points comprises receiving one or more messages comprising identity or position information for the subset of wireless access points determined by the network entity based, at least in part, on one or more of a coverage area as it relates to the expected route for individual wireless transmitters or a historical observation frequency of individual wireless transmitters for mobile devices traveling along the expected route.

5. The method of claim 1, wherein said receiving at the communication interface of the mobile device one or more messages from the network entity comprising identity or position information for the subset of wireless transmitters comprises receiving one or more messages comprising identity or position information for the subset of wireless transmitters determined by the network entity based, at least in part, on a proximity of individual wireless transmitters to the expected route of the mobile device.

6. The method of claim 1, wherein said receiving at the communication interface of the mobile device one or more messages from the network entity comprising identity or position information for the subset of wireless transmitters comprises receiving one or more messages comprising identity or position information for the subset of wireless transmitters determined by the network entity based at least in part on one or more authorizations for the mobile device to communicate with one or more networks associated with individual wireless transmitters.

7. The method of claim 1, wherein said receiving at the communication interface of the mobile device one or more messages from the network entity comprising identity or position information for the subset of wireless transmitters comprises receiving one or more messages comprising identity or position information for the subset of wireless transmitters determined by the network entity based, at least in part, on information generated by the navigation application hosted by the mobile device indicative of a planned route for the mobile device as selected by a user.

8. The method of claim 1, further comprising receiving map information corresponding to one or more regions along the expected route of the mobile device that are determined to have reduced communication coverage.

9. The method of claim 8, wherein said receiving map information corresponding to the one or more regions along the expected route of the mobile device that are determined to have reduced communication coverage comprises receiving the one or more messages comprising map information while the mobile device is within range of a network communication resource and prior to the mobile device entering into the one or more regions determined to have limited communication coverage.

10. The method of claim 1, further comprising:
receiving at the communication interface of the mobile device one or more messages from the network entity comprising identity or position information for one or more wireless transmitters from which the mobile device may acquire relatively strong signals and with which the mobile device may establish communications; and
establishing communications with an individual wireless transmitter of the one or more wireless transmitters in response to the mobile device approaching a coverage areas of the individual wireless transmitter as the mobile device travels along the expected route.

11. The method of claim 1, wherein said receiving at the communication interface of the mobile device one or more messages from the network entity comprising identity or position information for the subset of wireless transmitters comprises receiving one or more messages comprising identity or position information partitioned according to one or more regions, wherein the one or more regions are individually partitioned into a plurality of chunks.

12. The method of claim 11, wherein the one or more regions comprise circular areas, and wherein the plurality of chunks comprise one or more pie-slice areas and a circular center area.

13. The method of claim 12, wherein said transmitting the one or more messages comprising the request for identity or position information for the subset of wireless transmitters partitioned according to the one or more regions further comprises determining one or more of the plurality of chunks for the one or more regions that are traversed by the expected route.

14. The method of claim 13, further comprising determining one or more checkpoints along the expected route to partition the expected route into a plurality of segments, the mobile device to transmit an additional request for a next set of wireless transmitter identity or position information for one or more chunks for the one or more regions traversed by a next segment of the expected route.

15. The method of claim 1, further comprising receiving one or more encrypted broadcast signals from one or more wireless transmitters located along the expected route.

16. The method of claim 1, wherein the subset of wireless transmitters comprises one or more of a subset of wireless local area network access points or a subset of wireless wide area network transmitters.

17. An article, comprising: a non-transitory storage medium having stored thereon one or more instructions executable by a processor of a mobile device to:
determine an expected route of the mobile device based, at least in part, on information generated by a navigation application hosted by the mobile device;
initiate a transmission of one or more messages comprising a request for identity or position information for a subset of wireless transmitters to be determined based at least in part on the expected route of the mobile device from the mobile device to a network entity, wherein the request for identity or position information includes information indicative of the expected route of the mobile device;
obtain identity or position information received at the mobile device for the subset of wireless transmitters determined by the network entity based at least in part on the expected route of the mobile device; and
remove power from a satellite positioning system function within the mobile device at least in part in response to receiving one or more messages from the network entity comprising identity or position information for a subset of wireless transmitters sufficient to allow for navigation operations to be performed using wireless transmitters located along the expected route.

18. The article of claim 17, wherein the storage medium has stored thereon further instructions executable by the processor of the mobile device to store one or more messages comprising identity or position information for the subset of wireless transmitters determined by the network entity based at least in part on the expected route of the mobile device.

19. The article of claim 17, wherein the storage medium has stored thereon further instructions executable by the processor of the mobile device to obtain the identity or position information received at the mobile device for the subset of wireless transmitters at least in part by obtaining one or more messages comprising identity or position entries fitting within a specified maximum transmission size.

20. The article of claim 17, wherein the storage medium has stored thereon further instructions executable by the processor of the mobile device to obtain the identity or position information for the subset of wireless transmitters at least in part by obtaining the identity or position information for the subset of wireless transmitters determined by the network entity based, at least in part, on one or more of a coverage area as it relates to the expected route for individual wireless transmitters or a historical observation frequency of individual wireless transmitters for mobile devices traveling along the expected route.

21. The article of claim 17, wherein the storage medium has stored thereon further instructions executable by the processor of the mobile device to obtain the identity or position information for the subset of wireless transmitters at least in part by obtaining the identity or position information for the subset of wireless transmitters determined by the network entity based, at least in part, on a proximity of individual wireless transmitters to the expected route of the mobile device.

22. The article of claim 17, wherein the storage medium has stored thereon further instructions executable by the processor of the mobile device to obtain the identity or position information for the subset of wireless transmitters at least in part by obtaining the identity or position information for the subset of wireless transmitters determined by the network entity based at least in part on one or more authorizations for the mobile device to communicate with one or more networks associated with individual wireless transmitters.

23. The article of claim 17, wherein the storage medium has stored thereon further instructions executable by the processor of the mobile device to obtain the identity or position information for the subset of wireless transmitters at least in part by obtaining the identity or position information for the subset of wireless transmitters determined by the network entity based, at least in part, on information generated by the navigation application hosted by the mobile device indicative of a planned route for the mobile device as selected by a user.

24. The article of claim 17, wherein the storage medium has stored thereon further instructions executable by the processor of the mobile device to initiate receiving map information corresponding to one or more regions along the expected route of the mobile device that are determined to have limited communication coverage.

25. The article of claim 24, wherein the storage medium has stored thereon further instructions executable by the processor of the mobile device to initiate said receiving map information corresponding to the one or more regions along the expected route of the mobile device that are determined to have limited communication coverage at least in part by initiating said receiving map information while the mobile device is within range of a network communication resource and prior to the mobile device entering into the one or more regions determined to have limited communication coverage.

26. The article of claim 17, wherein the storage medium has stored thereon further instructions executable by the processor of the mobile device to:
obtain from the network entity identity or position information for one or more wireless transmitters from which the mobile device may acquire relatively strong signals and with which the mobile device may establish communications; and
establish communications with an individual wireless transmitter of the one or more wireless transmitters in response to the mobile device approaching a coverage area of the individual wireless transmitter as the mobile device travels along the expected route.

27. The article of claim 17, wherein the storage medium has stored thereon further instructions executable by the processor of the mobile device to initiate the transmission of one or more messages to the network entity at least in part by initiating transmission of the request for identity or position information for the subset of wireless transmitters partitioned according to one or more regions, wherein the one or more regions are individually partitioned into a plurality of chunks.

28. The article of claim 27, wherein the one or more regions comprise circular areas, and wherein the plurality of chunks comprise one or more pie-slice areas and a circular center area.

29. The article of claim 28, wherein the storage medium has stored thereon further instructions executable by the processor of the mobile device to initiate the transmission of one or more messages comprising the request for identity or position information for the subset of wireless transmitters partitioned according to the one or more regions at least in part by determining one or more of the plurality of chunks for the one or more regions that are traversed by the expected route.

30. The article of claim 29, wherein the storage medium has stored thereon further instructions executable by the processor of the mobile device to determine one or more checkpoints along the expected route, the one or more checkpoints to partition the expected route into a plurality of segments, the one or more checkpoints to indicate to the mobile device to transmit an additional request for a next set of wireless transmitter identity or position information for one or more chunks for the one or more regions traversed by a next segment of the expected route.

31. The article of claim 17, wherein the storage medium has stored thereon further instructions executable by the processor of the mobile device to initiate receiving one or more encrypted broadcast signals from one or more wireless transmitters located along the expected route.

32. A mobile device, comprising: a processor to:
determine an expected route of the mobile device based, at least in part, on information generated by a navigation application hosted by the mobile device;
initiate transmitting one or more messages from a communication interface of the mobile device to a network entity, wherein the one or more messages comprise a request for identity or position information for a subset of wireless transmitters to be determined based at least in part on the expected route of the mobile device, wherein the request for identity or position information includes information indicative of the expected route of the mobile device;
obtain one or more messages received from the network entity comprising identity or position information for the subset of wireless transmitters determined by the network entity based at least in part on the expected route of the mobile device; and
remove power from a satellite positioning system function within the mobile device at least in part in response to receiving identity or position information for a subset of wireless transmitters sufficient to allow for navigation operations to be performed using wireless transmitters located along the expected route.

33. The mobile device of claim 32, further comprising a memory to store one or more signals indicative of the identity or position information for the subset of wireless transmitters determined by the network entity.

34. The mobile device of claim 32, the processor to obtain one or more messages received from the network entity comprising identity or position information for the subset of wireless transmitters at least in part by obtaining one or more messages received from the network entity comprising identity or position entries fitting within a specified maximum transmission size.

35. The mobile device of claim 32, the processor to obtain one or more messages received from the network entity comprising identity or position information for the subset of wireless transmitters at least in part by obtaining one or more messages comprising identity or position information for the subset of wireless transmitters determined by the network entity based, at least in part, on one or more of a coverage area as it relates to the expected route for individual wireless transmitters or a historical observation frequency of individual wireless transmitters for mobile devices traveling along the expected route.

36. The mobile device of claim 32, the processor to obtain one or more messages received from the network entity comprising identity or position information for the subset of wireless transmitters at least in part by obtaining one or more messages comprising identity or position information for the subset of wireless transmitters determined by the network entity based, at least in part, on a proximity of individual wireless transmitters to the expected route of the mobile device.

37. The mobile device of claim 32, the processor to obtain one or more messages received from the network entity comprising identity or position information for the subset of wireless transmitters at least in part by obtaining one or more messages comprising identity or position information for the subset of wireless transmitters determined by the network entity based at least in part on one or more authorizations for the mobile device to communicate with one or more networks associated with individual wireless transmitters.

38. The mobile device of claim 32, the processor to obtain one or more messages received from the network entity comprising identity or position information for the subset of wireless transmitters at least in part by obtaining one or more messages comprising identity or position information for the subset of wireless transmitters determined by the network entity based, at least in part, on information generated by the navigation application hosted by the mobile device indicative of a planned route for the mobile device as selected by a user.

39. The mobile device of claim 32, the processor further to initiate receiving map information corresponding to one or more regions along the expected route of the mobile device determined to have reduced communication coverage.

40. The mobile device of claim 39, the processor further to initiate receiving map information corresponding to the one or more regions along the expected route of the mobile device that are determined to have reduced communication coverage at least in part by receiving the one or more messages comprising map information while the mobile device is within range of a network communication resource and prior to the mobile device entering into the one or more regions determined to have reduced communication coverage.

41. The mobile device of claim 32, the processor further to:
initiate receiving at the communication interface of the mobile device one or more messages from the network entity comprising identity or position information for one or more wireless transmitters from which the mobile device may acquire relatively strong signals and with which the mobile device may establish communications; and
establish communications with an individual wireless transmitter of the one or more wireless transmitters in response to the mobile device approaching a coverage area of the individual wireless transmitter as the mobile device travels along the expected route.

42. The mobile device of claim 32, the processor to initiate transmission of one or more messages comprising the request for identity or position information for the subset of wireless transmitters at least in part by initiating the transmission of one or more messages comprising the request for identity or position information for the subset of wireless transmitters partitioned according to one or more regions, wherein the one or more regions are individually partitioned into a plurality of chunks.

43. The mobile device of claim 42, wherein the one or more regions comprise circular areas, and wherein the plurality of chunks comprise one or more pie-slice areas and a circular center area.

44. The mobile device of claim 43, the processor to initiate transmission of the one or more messages comprising the request for identity or position information for the subset of wireless transmitters partitioned according to the one or more regions at least in part by determining one or more of the plurality of chunks for the one or more regions that are traversed by the expected route.

45. The mobile device of claim 44, the processor further to determine one or more checkpoints along the expected route, the one or more checkpoints to partition the expected route into a plurality of segments, the one or more checkpoints to indicate to the mobile device to transmit an additional request for a next set of wireless transmitter identity or position information for one or more chunks for the one or more regions traversed by a next segment of the expected route.

46. The mobile device of claim 32, the processor further initiate receiving one or more encrypted broadcast signals from one or more wireless transmitters located along the expected route.

47. An apparatus, comprising:
means for determining an expected route of a mobile device based, at least in part, on information generated by a navigation application hosted by the mobile device;
means for transmitting one or more messages to a network entity, wherein the one or more messages comprise a request for identity or position information for a subset of wireless transmitters to be determined based at least in part on the expected route of the mobile device, wherein the request for identity or position information includes information indicative of the expected route of the mobile device;
means for receiving one or more messages from the network entity comprising identity or position information for the subset of wireless transmitters determined by the network entity based at least in part on the expected route of the mobile device; and
means for removing power from a satellite positioning system function within the mobile device at least in part in response to receiving one or more messages from the network entity comprising identity or position information for a subset of wireless transmitters sufficient to allow for navigation operations to be performed using wireless transmitters located along the expected route.

48. The apparatus of claim 47, further comprising means for storing one or more signals indicative of the identity or position information for the subset of wireless transmitters determined by the network entity.

49. The apparatus of claim 47, wherein said means for receiving the one or more messages from the network entity comprising identity or position information for the subset of wireless transmitters comprises means for receiving one or more messages comprising identity or position entries fitting within a specified maximum transmission size.

50. The apparatus of claim 47, wherein said means for receiving one or more messages from the network entity comprising identity or position information for the subset of wireless transmitters comprises means for receiving one or more messages comprising identity or position information for the subset of wireless transmitters determined by the network entity based, at least in part, on one or more of a coverage area as it relates to the expected route for individual wireless transmitters or a historical observation frequency of individual wireless transmitters for mobile devices traveling along the expected route.

51. The apparatus of claim 47, wherein said means for receiving the one or more messages from the network entity comprising identity or position information for the subset of wireless transmitters comprises means for receiving one or more messages comprising identity or position information for the subset of wireless transmitters determined by the network entity based, at least in part, on a proximity of individual wireless transmitters to the expected route of the mobile device.

52. The apparatus of claim 47, wherein said means for receiving one or more messages from the network entity comprising identity or position information for the subset of wireless transmitters comprises means for receiving one or more messages comprising identity or position information for the subset of wireless transmitters determined by the network entity based at least in part on one or more authorizations for the mobile device to communicate with one or more networks associated with individual wireless transmitters.

53. The apparatus of claim 47, wherein said means for receiving one or more messages from the network entity comprising identity or position information for the subset of wireless transmitters comprises means for receiving one or more messages comprising identity or position information for the subset of wireless transmitters determined by the network entity based, at least in part, on information generated by the navigation application hosted by the mobile device indicative of a planned route for the mobile device as selected by a user.

54. The apparatus of claim 47, further comprising means for receiving one or more messages comprising map information corresponding to one or more regions along the expected route of the mobile device that are determined to have reduced communication coverage.

55. The apparatus of claim 54, wherein said means for receiving map information corresponding to the one or more regions along the expected route of the mobile device determined to have limited communication coverage comprises means for receiving map information while the mobile device is within range of a network communication resource and prior to the mobile device entering into the one or more regions determined to have reduced communication coverage.

56. The apparatus of claim 47, further comprising:
means for receiving at a communication interface of the mobile device one or more messages from the network entity comprising identity or position information for one or more wireless transmitters from which the mobile device may acquire relatively strong signals and with which the mobile device may establish communications; and
means for establishing communication with an individual wireless transmitter of the one or more wireless transmitters in response to the mobile device approaching a coverage area of the individual wireless transmitter as the mobile device travels along the expected route.

57. The apparatus of claim 47, wherein said means for transmitting the one or more messages to the network entity comprises means for transmitting the request for identity or position information for the subset of wireless transmitters partitioned according to one or more regions, wherein the one or more regions are individually partitioned into a plurality of chunks.

58. The apparatus of claim 57, wherein the one or more regions comprise circular areas, and wherein the plurality of chunks comprise one or more pie-slice areas and a circular center area.

59. The apparatus of claim 58, wherein said means for transmitting the one or more messages comprising the request for identity or position information for the subset of wireless transmitters partitioned according to the one or more regions further comprises means for determining one or more of the plurality of chunks for the one or more regions that are traversed by the expected route.

60. The apparatus of claim 59, further comprising means for determining one or more checkpoints along the expected route, a determined one or more checkpoints to partition the expected route into a plurality of segments, the determined one or more checkpoints to indicate to the mobile device to transmit an additional request for a next set of wireless transmitter identity or position information for one or more chunks for the one or more regions traversed by a next segment of the expected route.

61. The apparatus of claim 47, further comprising means for receiving one or more encrypted broadcast signals from one or more wireless transmitters located along the expected route.

* * * * *